United States Patent
Homoelle et al.

(10) Patent No.: US 8,852,392 B2
(45) Date of Patent: Oct. 7, 2014

(54) METHOD FOR THE PRODUCTION OF AN ELASTIC COMPOSITE MATERIAL WITH A TEXTILE SURFACE

(75) Inventors: Dieter Homoelle, Ochtrup (DE); Marcus Schoenbeck, Versmold (DE)

(73) Assignee: Mondi Consumer Packaging Technologies GmbH, Gronau (DE)

( * ) Notice: Subject to any disclaimer, the term of this patent is extended or adjusted under 35 U.S.C. 154(b) by 35 days.

(21) Appl. No.: 13/299,547

(22) Filed: Nov. 18, 2011

(65) Prior Publication Data

US 2012/0152466 A1    Jun. 21, 2012

(30) Foreign Application Priority Data

Dec. 17, 2010   (EP) .................................... 10195598

(51) Int. Cl.
| | |
|---|---|
| B32B 38/10 | (2006.01) |
| D04H 1/4291 | (2012.01) |
| D04H 1/42 | (2012.01) |
| B32B 38/00 | (2006.01) |
| B32B 37/12 | (2006.01) |

(52) U.S. Cl.
CPC ............... D04H 1/42 (2013.01); D04H 1/4291 (2013.01); *B32B 37/1284* (2013.01); *B32B 2307/51* (2013.01); *B32B 2305/20* (2013.01); *B32B 38/0004* (2013.01)
USPC .......................................... 156/717; 156/714

(58) Field of Classification Search
USPC ......................................... 156/714, 717, 718
See application file for complete search history.

(56) References Cited

U.S. PATENT DOCUMENTS

| | | | | |
|---|---|---|---|---|
| 1,758,502 | A * | 5/1930 | Crowell ......................... | 156/254 |
| 3,690,985 | A * | 9/1972 | Price ............................. | 156/254 |
| 3,837,946 | A * | 9/1974 | Gribbin .......................... | 156/68 |
| 4,394,416 | A * | 7/1983 | Shimizu et al. ................ | 428/341 |
| 2003/0021970 | A1* | 1/2003 | Noelle .......................... | 428/212 |
| 2003/0091618 | A1* | 5/2003 | Seth et al. ..................... | 424/443 |
| 2006/0143767 | A1* | 7/2006 | Yang et al. ..................... | 2/16 |
| 2007/0254547 | A1* | 11/2007 | Ducauchuis et al. .......... | 442/381 |
| 2008/0202665 | A1* | 8/2008 | Seago ............................ | 156/84 |
| 2009/0182297 | A1* | 7/2009 | Hedstrom et al. ....... | 604/385.13 |
| 2010/0062221 | A1* | 3/2010 | Hoenigmann et al. ........ | 428/156 |
| 2010/0096074 | A1 | 4/2010 | Schoenbeck et al. | |

FOREIGN PATENT DOCUMENTS

| | | |
|---|---|---|
| EP | 2 177 654 | 4/2010 |
| GB | 2 066 732 | 7/1981 |

OTHER PUBLICATIONS

European Search Report dated May 24, 2011 in European Patent Application No. EP 10 19 5598 with English translation of relevant parts.

* cited by examiner

*Primary Examiner* — Mark A Osele
(74) *Attorney, Agent, or Firm* — Collard & Roe, P.C.

(57) ABSTRACT

A method for the production of an elastic composite material with a textile surface. First, a laminate is produced, which has elastic cover layers and a core composed of a nonwoven fabric. Subsequently, the laminate is separated into two strips, each of which has a cover layer and an adhering layer of nonwoven fabric, by tearing open the core.

6 Claims, 2 Drawing Sheets

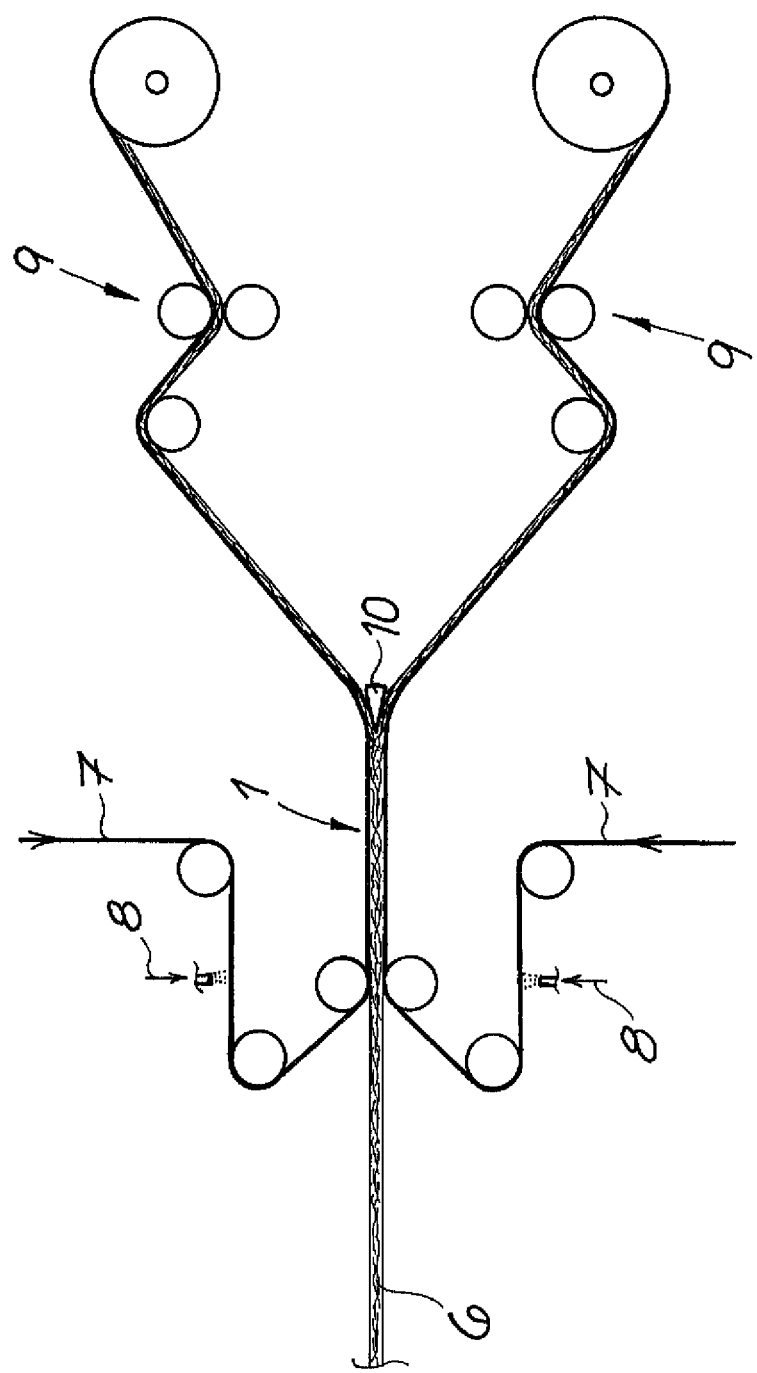

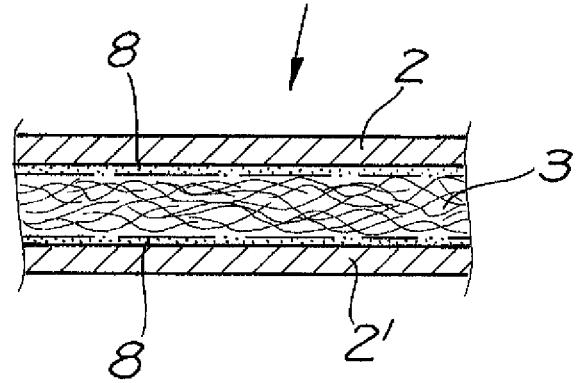
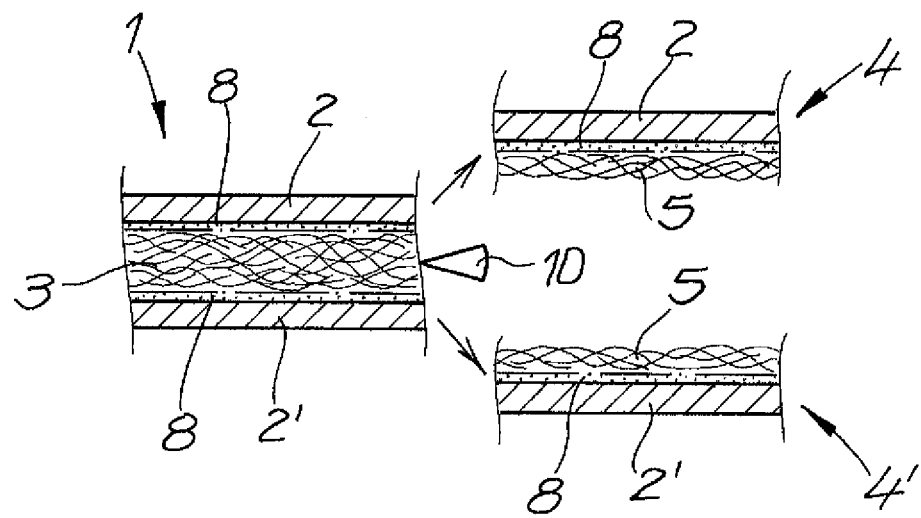

METHOD FOR THE PRODUCTION OF AN ELASTIC COMPOSITE MATERIAL WITH A TEXTILE SURFACE

CROSS REFERENCE TO RELATED APPLICATIONS

Applicants claim priority under 35 U.S.C. §119 of European Application No. 10 195 598.7 filed Dec. 17, 2010, the disclosure of which is incorporated by reference.

BACKGROUND OF THE INVENTION

1. Field of the Invention

The invention relates to a method for the production of an elastic composite material with a textile surface.

2. The Prior Art

Elastic composite materials with a textile surface are used, among other things, for the production of baby diapers, for example as tapes or as an elastic back-sheet, incontinence articles, feminine hygiene products, and the like. In these applications, the textile surface, which must be produced in cost-advantageous manner, has great importance. In this connection, the textile surface is not allowed to impair the elasticity of the film.

Composite materials composed of an elastic carrier film and a nonwoven fabric that is laminated on are known. The fabric forms a solid structure that decisively influences the stretching behavior of the composite material. Composite materials composed of an elastic carrier film and a nonwoven fabric that is laminated on must therefore be mechanically activated, by mechanical stretching, after the lamination process.

A method for the production of an elastic composite material with a textile surface is described in European Patent Application No. EP 2 177 654 A1, in which a layer of melt-blown nonwoven is produced and glued onto an elastic film without any prior consolidation. In this method, the nonwoven layer is not rolled up and unrolled, and no guidance of the nonwoven layer under tensile stress is provided. The nonwoven layer can therefore be formed with little strength and, in particular, with a low weight per surface area unit, and does not greatly hinder elastic stretching of the composite material. For this reason, the composite material does not require any subsequent mechanical activation. However, the bond strength between the fibers of the textile layer and the elastic film is not yet satisfactory. Since the work is conducted with loose fibers, to a great extent, it is not ensured that all the fibers will be sufficiently anchored in the adhesive matrix. Fibers can unintentionally come loose from the composite and be taken in by the user.

SUMMARY OF THE INVENTION

It is therefore an object of the invention to provide a method for the production of a composite material with a textile surface, which material has great stretching capacity, and the textile surface of which material does not contain any loose fibers that come loose from the composite during use of the composite material.

This object is accomplished according to the invention by a method for the production of an elastic composite material, in which first a laminate is produced, which has elastic cover layers and a core composed of a nonwoven fabric. The laminate is subsequently separated into two strips, each of which has a cover layer and an adhering layer of nonwoven fabric, by tearing open the core. The method has the advantage that the fibers of the textile surface are bound in the nonwoven fabric, and that when the core, which consists of a nonwoven fabric, is torn open, no free fibers that can easily come loose from the composite are formed. A nonwoven fabric that is slightly consolidated can be used. The degree of consolidation can be adjusted, for example when using calender consolidation, so that the composite material can be elastically stretched without subsequent mechanical activation, and so that the stretching properties are determined by the elasticity of the cover layer.

In order to separate the laminate, the strips are preferably grasped separately and pulled apart by applying tensile forces. The strips can be guided over driven rollers and wound up separately. The separation process is connected with mechanical activation of the elastic cover layer of the strips, specifically by means of stretching of the elastic cover layers during the pulling-off process. During pulling off and winding up of the strips, the strips can be stretched in the transverse direction and/or the longitudinal direction, by means of with suitable devices. In particular, the strips can also be passed over profiled rollers in which over-stretching of the strips transverse to the take-off direction takes place. In this way, the stretching properties of the composite material can be influenced and further improved.

Tearing open the nonwoven fabric can be supported by means of a blade disposed in the separation plane.

The laminate with elastic cover layers and a core composed of nonwoven fabric can be produced in different ways. Preferably, the nonwoven fabric is laminated in between two elastic film webs. However, extrusion lamination, in which the elastic layers are applied to the nonwoven fabric by means of extrusion, is fundamentally also possible.

The elastic cover layers preferably have a layer thickness between 20 µm and 100 µm, and can consist of a styrene block copolymer or a thermoplastic polyolefin elastomer. In addition to mono-films, multi-layer co-extruded films can also be used for the cover layers. In particular, perforated or breathable elastic films can also be used for the cover layers. When using a breathable elastic film, this important property is maintained in the composite material. In place of an elastic film, an elastic nonwoven fabric that has sufficient tensile strength can also be used.

The nonwoven fabric and the elastic film webs or elastic cover layers are preferably glued to one another, whereby polyurethane adhesive and hot-melt adhesives are particularly suitable. The adhesive can be applied over the entire area or in patterns, for example in dots. Full-area application of adhesive is preferred, whereby an adhesive application with an application amount between 1 $g/m^2$ and 2.5 $g/m^2$ is sufficient when using a solvent-free one-component polyurethane adhesive (1-K-PUR). When using a hot-melt adhesive, a higher application weight of 3 $g/m^2$ to 5 $g/m^2$ will generally be necessary.

The nonwoven fabric that forms the core of the laminate and is torn open in the course of the production process preferably consists of a melt-blown nonwoven. The fibers of a melt-blown nonwoven are produced by extrusion, and usually exit from multiple holes of an extrusion nozzle disposed next to one another. Immediately after leaving the extrusion nozzle, the viscous polymer strands that exit from the holes are impacted with compressed air and stretched. Melt-blown fibers are very thin and guarantee good homogeneous coverage of the elastic cover layers even at a low weight per surface area unit, and distinguish themselves by their particularly soft appearance. The nonwoven preferably consists of polyolefin fibers, particularly polypropylene fibers. The melt-blown nonwoven is only slightly consolidated for the method according to the invention, and can be used at a weight per surface area unit of 5 g/m² to 20 g/m². The degree of consolidation, for example by means of calender consolidation, is guided by the desired stretching properties of the composite material.

A multi-layer nonwoven fabric with an SMS layer structure (spun-melt-spun) can also be used as a nonwoven fabric; this has outer layers composed of a spun-bonded nonwoven fabric (S) and a center nonwoven layer composed of melt-blown fibers (M). The combination of layers composed of a spun-bonded nonwoven fabric and a melt-blown nonwoven imparts greater strength in the machine direction (MD direction) to the nonwoven fabric. When the pre-finished laminate is torn open, separation of the nonwoven fabric within the core layer, which consists of a melt-blown nonwoven, takes place. It was found that the material thickness and the weight per surface area unit of the strips separated by tearing open the laminate remains constant, within close tolerances, if the parting plane runs through a core layer composed of a melt-blown nonwoven. High-quality composite material strips are obtained, particularly strips with a very high-quality textile surface.

Other nonwoven fabrics can also be used for the method according to the invention. However, the quality of the textile surface is poorer, for example if a carded nonwoven is used as the core layer of the laminate.

A composite material produced according to the method according to the invention is suitable for hygiene articles, for example for sections or closure elements on baby diapers and incontinence articles. Furthermore, so-called soft-touch films for applications outside of the hygiene sector can also be produced according to the method according to the invention.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a method for the production of an elastic composite material with a textile surface, FIG. 2 shows a section through a laminate that is produced as a pre-product, in the method shown in FIG. 1, and FIG. 3 shows the separation of the pre-product shown in FIG. 2, in a representation that is enlarged as compared with FIG. 1.

DETAILED DESCRIPTION OF THE PREFERRED EMBODIMENT

Referring now in detail to the drawings, the method shown in FIG. 1 serves for the production of an elastic composite material with a textile surface, which can be used, for example, as a soft-touch film or as an elastic element on baby diapers, incontinence articles, and the like. In the method, in a first step, a laminate 1 is produced as a pre-product; this laminate has elastic cover layers 2, 2' and a core 3 composed of a nonwoven fabric. FIG. 2 shows the layer structure of the pre-product. Subsequently, laminate 1 is separated into two strips 4, 4' by tearing open core 3; these strips each have a cover layer 2, 2' and an adhering layer composed of nonwoven fabric 5. Strips 4, 4' each form a method product that can be used as an elastic composite material, without any subsequent mechanical activation.

Core 3 consists of a melt-blown nonwoven or has a multi-layer structure with outer layers composed of a spun-bonded nonwoven fabric and a center nonwoven layer composed of melt-blown fibers. A nonwoven fabric web 6 that forms core 3 is laminated in between two elastic film webs 7, and glued to film webs 7. Adhesive 8 is preferably applied, over the full area, to the surface of film web 7 that lies adjacent to the nonwoven fabric. Polyurethane adhesives or hot-melt adhesives can be used as adhesive 8.

Laminate 1 is separated by tearing open core 3 to form two strips 4, 4'. Strips 4, 4' are grasped separately and pulled apart by applying tensile forces. According to the representation in FIG. 1, strips 4, 4' are passed over driven rollers of a take-off device 9 and wound up separately. Optionally, take-off device 9 can be combined with a stretching device in which strips 4, 4' are stretched in the transverse direction and thereby mechanically activated.

Tearing open core 3 can be supported by means of a blade 10 disposed in the parting plane.

When comparing FIGS. 2 and 3, it can be seen that elastic composite materials, namely strips 4, 4', are produced according to the method according to the invention; these strips have an elastic carrier as well as a textile surface. The elastic carrier is formed by a cover layer 2, 2' of laminate 1, and gives the composite material its mechanical properties. The textile structure is dependent on the nonwoven fabric used in core 3 of laminate 1. Preferably, separation takes place through a nonwoven layer composed of a melt-blown nonwoven, the fibers of which are thin and form a high-quality textile surface during separation. A slightly consolidated nonwoven is processed for the production of laminate 1 that forms the pre-product. No free fibers that can come loose when the composite material is used are formed as the result of the separation of the nonwoven layer in the subsequent step. When nonwoven fabric core 3 is separated, strips 4, 4' are formed, which have constant values with regard to the material thickness and their weight per surface area unit, within close tolerance limits.

Accordingly, while only a few embodiments of the present invention have been shown and described, it is obvious that many changes and modifications may be made thereunto without departing from the spirit and scope of the invention.

What is claimed is:

1. A method for the production of an elastic composite material with a textile surface, comprising:
   producing a laminate that has elastic cover layers and a core composed of a nonwoven fabric, and
   subsequently separating the laminate into two strips, each strip having a cover layer and an adhering layer of nonwoven fabric, by tearing open the core;
   wherein the core comprises a multi-layer nonwoven fabric with an SMS layer structure, which fabric has outer layers composed of a spun-bonded nonwoven fabric (S) and a center nonwoven layer composed of melt-blown fibers (M).

2. The method according to claim 1, wherein the step of separating comprises grasping the strips separately and pulling them apart by applying tensile forces.

3. The method according to claim 1, wherein the strips are passed over driven rollers and wound up separately.

4. The method according to claim 1, wherein the step of tearing open the core is supported by a blade disposed in a parting plane.

5. The method according to claim 1, wherein the core is formed of a nonwoven fabric web, which is laminated in between the elastic cover layers which are formed of elastic film webs.

6. The method according to claim 5, wherein the nonwoven fabric web and the elastic film webs are glued together.

* * * * *